(No Model.)

E. H. G. BRINSER.
RATCHET WASHER NUT LOCK.

No. 530,881. Patented Dec. 11, 1894.

Witnesses:
D. Grant Johnston
Frank G. Urban

Inventor:
Eli H. G. Brinser.
By Dan H. Herr,
Attorney.

THE NORRIS PETERS CO., PHOTO-LITHO., WASHINGTON, D. C.

UNITED STATES PATENT OFFICE.

ELI H. G. BRINSER, OF ELIZABETHTOWN, PENNSYLVANIA.

RATCHET-WASHER NUT-LOCK.

SPECIFICATION forming part of Letters Patent No. 530,881, dated December 11, 1894.

Application filed May 21, 1894. Serial No. 511,932. (No model.)

*To all whom it may concern:*

Be it known that I, ELI H. G. BRINSER, a citizen of the United States, residing at Elizabethtown, in the county of Lancaster and State of Pennsylvania, have invented certain new and useful Improvements in Ratchet-Washer Nut-Locks; and I do hereby declare the following to be a full, clear, and exact description of the invention, such as will enable others skilled in the art to which it appertains to make and use the same.

This invention relates to improvements in a nut-lock of that class in which a washer is provided with a corrugated or notched arm, or arms, bent over to embrace the periphery of the nut so that said notches or corrugations will engage the angular edges of the nut.

The object of the invention is to provide a nut-lock, at a minimum of cost, that will be simple in construction, easy in application, and effective in result; that will prevent a nut from turning in any position in which it may have been placed.

The distinctive features of the invention will clearly appear in the following description, will be distinctly set forth in the claims, and are severally illustrated in the accompanying drawings, in which similar letters of reference designate like parts throughout the several views, and in which—

Figure 1:
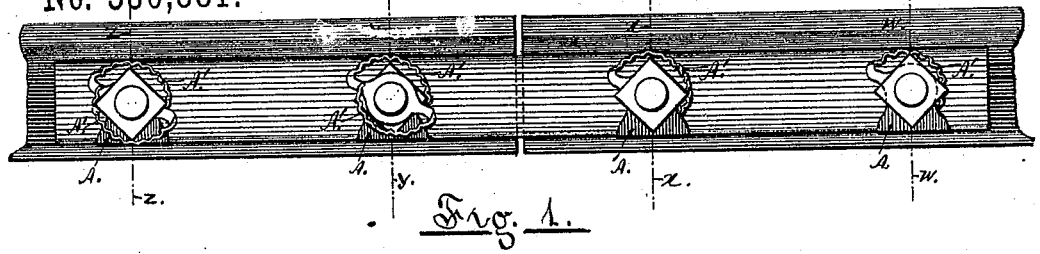
Figure 2:
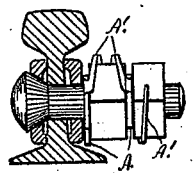

Figure 1 is a side elevation of a railway rail joint showing washers embodying the elements of my invention in position on the several nuts. Figs. 2, 3, 4, and 5, are sectional elevations, from the left, of the portions to the right, respectively, of the lines $z\,z$, $y\,y$, $x\,x$, $w\,w$, in Fig. 1; and Figs. 6 to 18, inclusive, are views showing details in the construction.

As will be seen in the drawings the washer of my invention consists of the body portion, A, and the arm portion A′, and it may be made of any suitable material, having the required strength, that may be given the required shape by any process whatever. These portions are preferably made integral, punched in blank from sheet metal, (Figs. 6, 8, 13, and 18.)

The body portions are provided with orifices $a$, for the passage of the threaded bolt ends, when the washers are placed in position; and the arm portions, provided with corrugations, forming notches $a'$, are turned over and curved spirally inward, bringing their free ends, $a^2$, nearer the bolt centers than are their heels or attached ends, $a^3$, (Figs. 7, 9, 13, and 18.)

Figure 3:
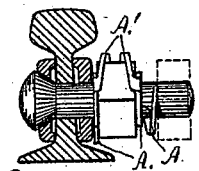
Figure 4:
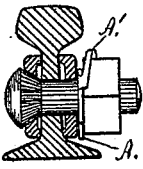
Figure 5:
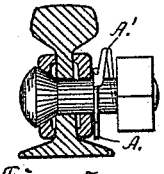
Figure 11:
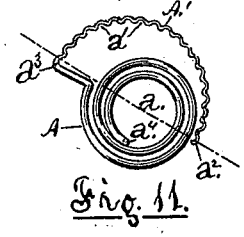

The arms are adapted to partially surround the perimeters of the nuts, and the notches are adapted to receive and hold the edges of the angles of said nuts (Fig. 11). The arms are made tapering forward so that they may be considerably depressed without coming in contact with the bodies of the washers while the nuts are being screwed home and the arms adjusted to the bodies of said nuts (Figs. 3 and 5).

Figure 12:
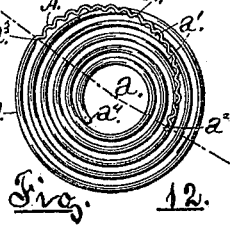
Figure 14:
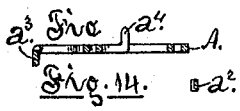
Figure 15:
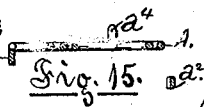
Figure 16:

The washer shown in Fig. 14 is made of rectangular or square bar iron, but the end within the central orifice is turned angularly inward, forming a point $a^4$ (Fig. 14), adapted to engage the body of the plate or substance upon which the washer is placed to keep it from turning, and Figs. 11 and 15 show a similar one made of wire or round iron, while Figs. 12 and 16 illustrate one consisting of a continuous coil of such wire or bar iron, but in this case the notched arm will partially overlap the body of the washer.

Figure 13:
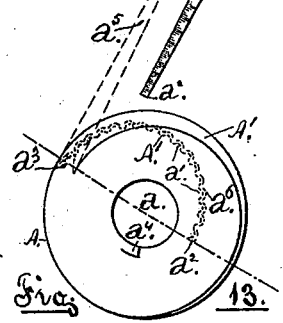
Figure 17:
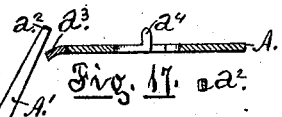

Figs. 13 and 17, show a washer made from a circular plate or disk, in which the arm is first hammered out to bring it in the position indicated by the dotted line $a^5$ before it is notched and turned over into position indicated by the dotted lines $a^6$.

Figure 6:
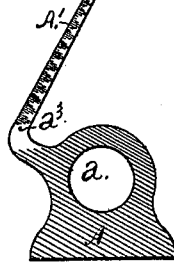
Figure 7:
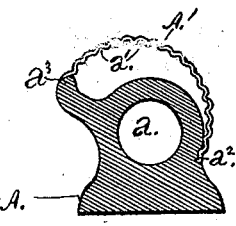
Figure 8:
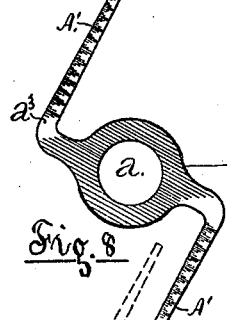
Figure 9:
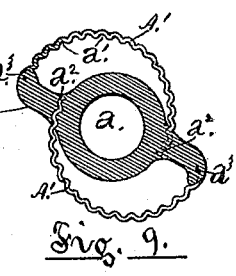
Figure 10:
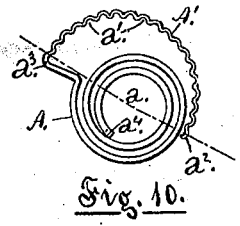
Figure 18:
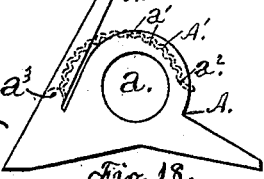

In Fig. 18 is shown a modification of the washer shown in Figs. 6 and 7. In this washer the forward end, $a^2$, of the locking arm is shown to be bent or curved outward so that said end will not butt against a side of a tightened nut and prevent said nut from turning when it is desired to loosen the same.

In the drawings my washer nut-lock is shown in place on a fish plate where two rails are jointed (Figs. 1 to 5); and, the fish-plates and rails, as well as the bolts and nuts used in completing said joints, are all so well-known in railroad construction, that they are not herein designated by letter. The form of washer illustrated in Figs. 6 and 7 is here applied to the fish-plate, bolt and nut, while that shown in Fig. 18 may be used instead; and any of those illustrated in Figs. 10 to 13 may be substituted therefor; for the inwardly projecting pins, $a^4$, best shown in Figs. 14 to 17, are adapted to enter the side of the bolt orifices in the fish-plate to keep the washers from turning; but, when a second, or jam nut, is placed on a bolt end (Figs. 2 and 3) and a washer like the one shown in Figs. 8 and 9 placed between them, one of its arms is applied to the main nut to keep the washer from turning, and the other arm to the jam nut as shown, said second or jam nut, after having been screwed home, will be prevented from turning, or it will be securely locked.

An inspection of Fig. 5 of the drawings clearly shows that when a nut is applied to a bolt end which was previously provided with my locking washer the back of the nut will first come in contact with the locking arm of said washer, pressing on its outer end; that as said nut is being screwed home, it gradually compresses said arm till its angular edges will be entirely within the curvature near the heel thereof, when the notches of the arm, by engaging the angle-edges of the nut, will securely lock said nut and prevent the same from turning loose. Again an inspection of Fig. 3 shows, that when a nut has been screwed home and locked in place on its bolt by the arm of a washer as shown, and a two-armed washer (Fig. 9) having been placed thereon so that the notches of its rearward arm shall be in engagement with the angular edges of the nut, the latter washer, by reason of said engagement, will be held from turning, and when a second nut shall have been placed thereon and screwed home said second nut will be securely held from turning loose by the notches of the other arm of said washer. See Fig. 2.

I am aware that washer nut-locks provided with various means to hold them in place, as well as with projecting arms to bear against the sides of the nuts to keep said nuts from turning, are old and well known to the trade. I, therefore, do not claim anything in this application broadly, but What I do consider new, and desire to secure by Letters Patent, is—

1. In a washer provided with means to keep it from turning, the side projecting arm or arms curving spirally inward from the heels to the points thereof, said arms having their upper and lower edges forwardly approaching and their forward ends outwardly curved and the corrugations or notches in the concaved faces of the curved portions of said arms, substantially as described and for the purpose hereinbefore set forth.

2. The combination in a ratchet washer nut-lock, with a washer having means provided to keep said washer from turning, of a forwardly tapering, inwardly concaved and spirally curved arm, having its wider rear end rigidly secured to the edge of said washer, and its narrower front end outwardly curved, and corrugations or notches in the concaved inner face of said arm, all substantially as and for the purpose hereinbefore set forth.

In testimony whereof I affix my signature in presence of two witnesses.

ELI H. G. BRINSER.

Witnesses:
DANL. H. HERR,
PAUL A. HERR.